United States Patent [19]

Magee et al.

[11] Patent Number: 4,757,472
[45] Date of Patent: Jul. 12, 1988

[54] ELECTROPHOTOGRAPHIC OPTICAL MEMORY SYSTEM

[75] Inventors: Frederick N. Magee, San Jose; William M. Brooks, Aptos, both of Calif.

[73] Assignee: Tecon Memory, Inc., Redmond, Wash.

[21] Appl. No.: 948,385

[22] Filed: Dec. 31, 1986

[51] Int. Cl.⁴ ...................... G11C 13/00; G11C 13/04; G11B 7/00; G11B 7/013
[52] U.S. Cl. .................................. 365/120; 365/126; 365/127
[58] Field of Search ....................... 365/120, 126, 127; 346/151, 135.1; 372/24; 369/100, 110, 111; 430/19, 350, 945

[56] References Cited

U.S. PATENT DOCUMENTS

| | | | |
|---|---|---|---|
| 3,055,006 | 9/1962 | Dreyfoods, Jr. et al. | 346/151 |
| 3,227,805 | 1/1966 | Lemelson | 365/126 |
| 3,264,693 | 4/1966 | Gardineer et al. | 430/19 |
| 3,291,601 | 12/1966 | Gaynor . | |
| 3,344,365 | 9/1967 | Lewis | 331/86 |
| 3,357,989 | 12/1967 | Byrne et al. . | |
| 3,372,973 | 3/1968 | Flinchbaugh | 372/24 |
| 3,397,086 | 8/1968 | Bartfai . | |
| 3,408,593 | 10/1968 | Hurwitz, Jr. | 372/24 |
| 3,432,221 | 3/1969 | Harris et al. | 372/24 |
| 3,436,679 | 4/1969 | Fenner | 372/24 |
| 3,448,405 | 6/1969 | Wolff | 372/24 |
| 3,469,206 | 9/1969 | Harris et al. | 372/24 |
| 3,475,760 | 10/1969 | Carlson | 430/350 |
| 3,480,875 | 11/1969 | Pole | 372/24 |
| 3,480,877 | 11/1969 | Dillon, Jr. et al. | 372/24 X |
| 3,492,596 | 1/1970 | Vorie | 372/24 |
| 3,509,489 | 4/1970 | Burns et al. | 372/24 |
| 3,512,870 | 5/1970 | Wilson, Jr. et al. | 372/24 X |
| 3,516,013 | 6/1970 | Pole | 372/24 |
| 3,519,953 | 7/1970 | Gamblin et al. | 372/24 |
| 3,521,193 | 7/1970 | Wingfield et al. | 372/24 |
| 3,524,145 | 8/1970 | Fowler | 372/24 |
| 3,527,520 | 9/1970 | Harris | 372/24 X |
| 3,533,015 | 10/1970 | Wuerker | 372/24 |
| 3,542,545 | 11/1970 | Goffe . | |
| 3,547,628 | 12/1970 | Wolff | 346/151 |
| 3,566,303 | 2/1971 | De Maria | 372/24 |

(List continued on next page.)

| | | | |
|---|---|---|---|
| 3,643,178 | 2/1972 | Marshall | 372/24 |
| 3,648,607 | 3/1972 | Gundlach . | |

OTHER PUBLICATIONS

Applications of Xerox Dry Microfilm (XDM), A Camera-Speed, High Resolution, Nonsilver Film with Instant, Dry Development, SPSE, vol. 10, No. 5, Oct. 1984.

(List continued on next page.)

Primary Examiner—Stuart N. Hecker
Assistant Examiner—Alyssa Bowler
Attorney, Agent, or Firm—Seed and Berry

[57] ABSTRACT

An optical memory system for storage and retrieval of digital data using a source of writing light in the visible light range and a separate source of near infrared, polarized reading light. The writing light is amplitude modulated by a signal containing the digital data to be stored. Horizontal and vertical deflectors deflect the beams to scan horizontally and vertically in response to control signals. The scanning beams are focused to a focal point to impinge upon a stationary medium manufactured of a dry film having submicron electrically photosensitive particles embedded in a thermoplastic layer mounted on a substantially transparent electrically conductive substrate. The particles are insensitive to light at the reading light wavelength. The particles are initially uncharged and the film is sensitive to light after receiving an initial surface charge. The regions of the medium with the charged particles and with the uncharged particles cause differing angular rotation of the electric and magnetic field vectors of the reading light, with the degree of rotation of the reading light after passing through the medium indicating whether a digital data bit of one or zero is recorded. A fixed mask is positioned in the focal plane of the lens and in juxtaposition with the medium. The mask is opaque to the writing and reading light beams and has a matrix of rows and columns of transparent apertures. The apertures define the extent of the regions of the medium with the charged and uncharged particles.

18 Claims, 2 Drawing Sheets

U.S. PATENT DOCUMENTS

| | | | |
|---|---|---|---|
| 3,655,986 | 4/1972 | Lax | 372/24 |
| 3,671,282 | 6/1972 | Goffe . | |
| 3,716,359 | 2/1973 | Sheridon | 430/19 |
| 3,717,824 | 2/1973 | Buczek et al. | 372/24 |
| 3,718,913 | 2/1973 | Maloney et al. | 430/19 |
| 3,720,513 | 3/1973 | Gundlach . | |
| 3,808,552 | 4/1974 | Baues | 372/24 |
| 3,816,118 | 6/1974 | Byrne . | |
| 3,878,515 | 4/1975 | D'Auria | 365/126 |
| 3,904,981 | 9/1975 | Hughes et al. | 372/24 |
| 3,979,210 | 9/1976 | Buckley et al. . | |
| 3,982,936 | 9/1976 | Goffe . | |
| 3,985,560 | 10/1976 | Gundlach | 96/1.5 |
| 3,992,090 | 11/1976 | Lysle | 346/151 X |
| 3,992,682 | 11/1976 | White et al. | 372/24 |
| 4,013,462 | 3/1977 | Goffe et al. . | |
| 4,014,695 | 3/1977 | Buckley et al. . | |
| 4,028,101 | 6/1977 | Buckley et al. | 96/1.5 |
| 4,040,047 | 8/1977 | Hareng et al. | 365/126 |
| 4,040,826 | 8/1977 | Goffe et al. | 96/1 PS |
| 4,042,526 | 8/1977 | Asahara et al. | 430/19 |
| 4,055,418 | 10/1977 | Buckley et al. . | |
| 4,075,610 | 2/1978 | Crandall et al. | 430/19 |
| 4,083,054 | 4/1978 | Moraw et al. | 346/151 |
| 4,115,803 | 9/1978 | Morton | 358/107 |
| 4,118,734 | 10/1978 | Bouwhuis et al. | 369/111 |
| 4,135,807 | 1/1979 | Moraw | 341/151 X |
| 4,218,688 | 8/1980 | Monari | 365/126 X |
| 4,223,062 | 9/1980 | Hession | 365/126 X |
| 4,250,465 | 2/1981 | Leib | 372/24 |
| 4,278,758 | 7/1981 | Drexler et al. | 430/350 X |
| 4,298,974 | 11/1981 | Tsunoda et al. | 369/111 X |
| 4,313,651 | 2/1982 | Miller, Jr. | 372/24 X |
| 4,371,954 | 2/1983 | Cornet | 365/126 |
| 4,403,318 | 9/1983 | Nagashima et al. | 369/100 |
| 4,428,069 | 1/1984 | Hazel et al. | 369/100 X |
| 4,457,444 | 10/1985 | Bell et al. | 430/945 X |
| 4,468,808 | 8/1984 | Mori et al. | 382/25 X |
| 4,478,782 | 10/1984 | Kuder et al. | 346/135.1 X |
| 4,527,173 | 7/1985 | Gupta et al. | 346/135.1 |
| 4,538,159 | 8/1985 | Gupta et al. | 430/945 X |
| 4,539,572 | 9/1985 | Robbins et al. | 346/135.1 |
| 4,548,889 | 10/1985 | Nemoto et al. | 430/945 X |
| 4,551,413 | 11/1985 | Bell | 430/945 X |
| 4,561,086 | 12/1985 | Geyer | 369/100 X |
| 4,565,772 | 1/1986 | Takeoka et al. | 430/945 X |
| 4,569,903 | 2/1986 | Hashiue et al. | 430/350 |
| 4,576,896 | 3/1986 | Suzuki et al. | 430/945 X |
| 4,579,807 | 4/1986 | Blonder et al. | 430/19 X |
| 4,586,165 | 4/1986 | Cornet et al. | 365/126 |

OTHER PUBLICATIONS

Xerox Dry Microfilm: A Versatile Camera–Film and Information–Recording Medium, SPSE, vol. 9, No. 1, Feb. 1983.

An Instant, Dry, Updatable Infrared Film with High Sensitivity and Resolution, SPSE, vol. 12, No. 1, Feb. 1986.

A Portable, Inexpensive Microfilm Camera–Processor–Viewer, Using Instant, Updatable Xerox Dry Microfilm, SPSE, vol. 6, No. 4, Aug. 1980.

"AMEN" Imaging: The Last Word in Nonsilver Photography?, SPSE, vol. 28, No. 6, Nov./Dec. 1984.

ELECTROPHOTOGRAPHIC OPTICAL MEMORY SYSTEM

DESCRIPTION

1. Technical Field

The present invention relates to computer mass memory devices.

2. Background of the Invention

With the introduction of high speed digital computers to business and industry, a problem has developed concerning the storage and retrieval of large quantities of digital data in a manner which does not significantly impact the operating speed of the computer and which is economic. While many forms of memory devices exist, such as magnetic floppy and hard discs, magnetic tapes and optical compact discs, each has its limitation as to capacity, speed of operation and cost.

The primary mass memory storage devices used with computers today, whether they be mainframe, minicomputers or microcomputers are magnetic tapes and discs. Even with a mainframe computer which might utilize a bank of 14 inch diameter hard discs, the memory capacity with 7 such discs is approximately 350 megabytes. Since a byte has 8 bits, this produces a total memory capacity of slightly less than 3 gigabits. While this is a substantial amount of memory, the size and cost of the hard discs involved and the equipment necessary to operate the disc is substantial. To achieve this quantity of storage capacity using floppy discs would require over 1,000 discs and is impractical.

While optical compact discs, known as CD-ROMs, are currently being discussed and can provide storage capacity in the large amounts mentioned above, they have inherent disadvantages in that the medium used for recording is generally non-erasable or rewritable. Furthermore, the CD-ROMS have inherent limitations in accuracy and speed because the CD-ROM uses a platter which must be mechanically rotated much like a record so that the appropriate portion of the rotating platter can be read. Read head alignment problems and the time required for the mechanical operation involved slow the read process down and add the chance for error and malfunction. Of course, the limitation of being a read only memory is in itself enough to make a CD-ROM useless in situations where data must be written to storage as the computer is operating.

As mentioned above, the speed of writing to and reading from memory is also a consideration. With conventional hard discs, the write speed is approximately 20 megahertz. With less expensive floppy disc memories, the write speed is significantly less. Even at the higher speed, the speed at which today's computers operate and the expected operating speeds of future generation computers require an increased speed of data storage and retrieval so that the central processing unit of the computer is not forced to wait or to perform unnecessary shifts between jobs to more economically use the waiting time while the disc drive head is moving to the location where the desired information is to be stored or read, and while the writing or reading takes place.

It will, therefore, be appreciated that there is a significant need for a mass memory system for storing digital data which avoids these problems and disadvantages, and provides increased storage capacity with a small size and low cost memory system. The memory system should be operable at write and read speeds far in excess of those possible today with hard discs and with a smaller bit error rate than presently possible. The memory system should be erasable as well as provide other advantages. The present invention fulfills these needs, and further provides other related advantages.

3. Disclosure of the Invention

The present invention resides in an optical memory system for storage and retrieval of digital data. The memory system includes a source of writing light having a first wavelength less than a threshold wavelength, and a source of reading light having a second wavelength greater than the threshold wavelength. Modulation means are provided for modulating the writing light by a write digital signal containing the digital data to be stored. Means are also provided for forming the writing light into a writing light beam, and means are provided for forming the reading light into a reading light beam. The invention further includes means for deflecting the writing and reading light beams along a first axis in response to a first control signal, and means for deflecting the beams along a second transverse axis at an angle to the first axis in response to a second control signal. Lens means are included for focusing the writing and reading light beams to a focal point with a focal plane therethrough.

The memory system includes a stationary medium manufactured of a dry film having submicron electrically photosensitive particles embedded in a thermoplastic layer mounted on a substantially transparent electrically conducting substrate. The particles are insensitive to light with a wavelength greater than the threshold wavelength. The particles are initially uncharged and the film is sensitive to light after receiving an initial surface charge. The uncharged particles acquire a charge at the expense of the surface charge upon being struck by the writing light beam. Regions of the medium with the charged particles and with the uncharged particles cause differing conditions of the reading light beam. Passage of the reading light beam through the charged particles corresponds to a recorded information bit of the digital data at one binary logic state and passage through the uncharged particles corresponds to a recorded information bit of the digital data at the other binary logic state.

A fixed mask is positioned substantially in the focal plane of the lens means and in juxtaposition with the medium, between the medium and the lens means. The mask is substantially opaque to the writing and reading light beams with a plurality of apertures substantially transparent to the beams. The apertures define the extent of the regions of the medium with the charged and uncharged particles. Each of the apertures has a size to admit sufficient energy when exposed to the writing light beam for a predetermined time period to exceed a sensitivity threshold value of the medium and charge the particles in the corresponding region of the medium to produce charged particles. The apertures are arranged in a plurality of rows aligned with the first axis and positioned one row adjacent to the other in the direction of the second axis.

The memory system further includes detector means positioned to be exposed to the reading light beam after passing through the mask apertures and the medium. The detector means is responsive to the incident ray of the reading light beam thereon and insensitive to the writing light beam, and detects conditioning of the reading light beam corresponding to passage through one of the regions of the medium with the charged particles, and to passage through one of the regions of the medium with the uncharged particles. The detector means further generates a read digital data signal containing the stored digital data from the medium. As such, the binary logic state of a recorded information bit corresponding to one of the regions of the medium is determined.

There is also included means for generating the first control signal to detect the writing and reading light beams to scan along a selected one of the rows of the apertures in the direction of the first axis at a selected scan speed. The selected scan speed for the writing light beam is such as to expose each of the apertures to the writing light beam for at least the predetermined time period to charge the particles in the corresponding region of the medium to produce charged particles.

The optical memory system further includes means for generating the second control signal to selectively deflect the writing and reading light beams to the selected row of the apertures. The memory system also has means for substantially uniformly charging a surface of the film with the initial charge prior to exposure to the writing light beam.

Other features and advantages of the invention will become apparent from the following detailed description, taken in conjunction with the accompanying drawings.

BEST MODE FOR CARRYING OUT THE INVENTION

Figure 1:
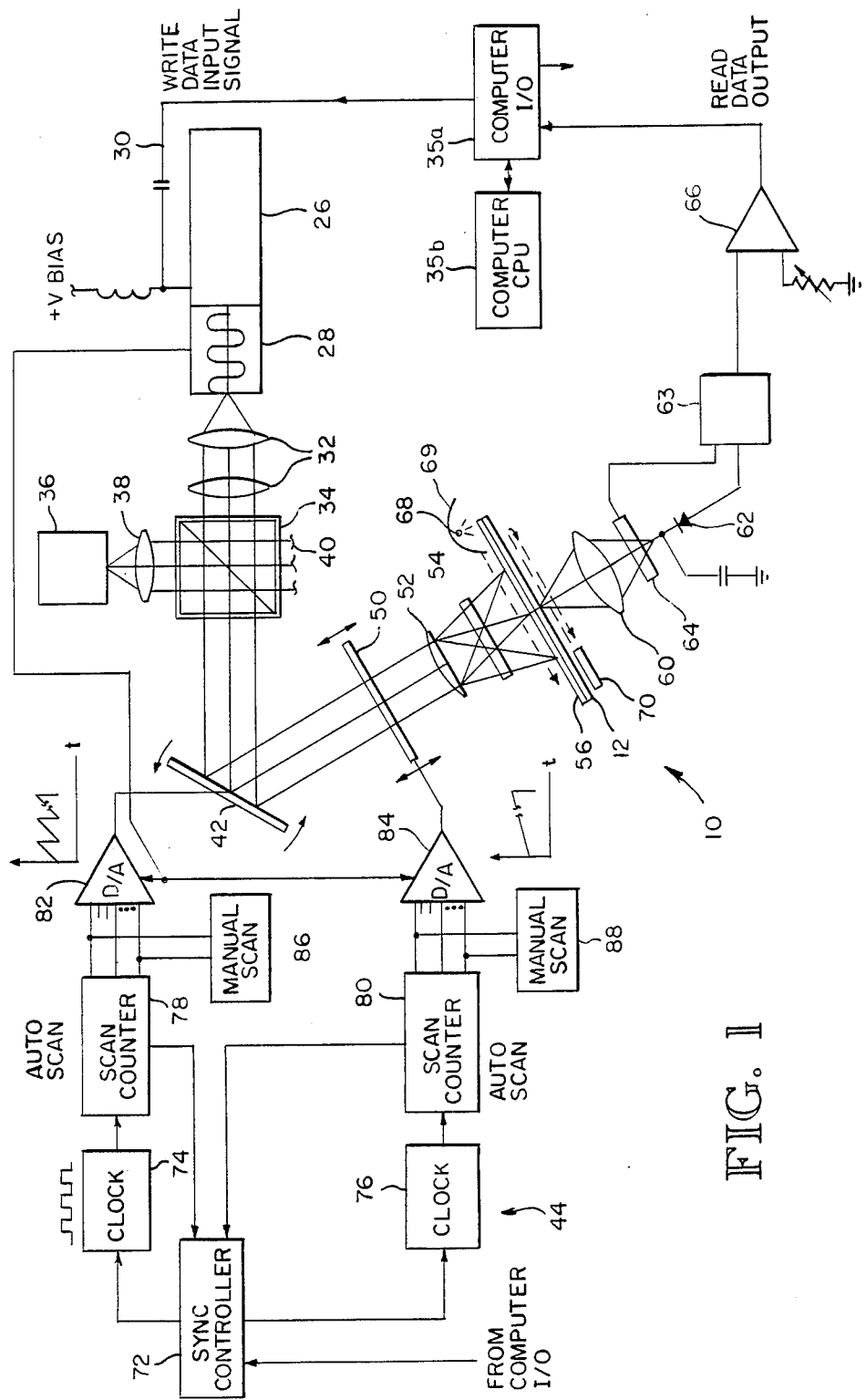
FIG. 1 is a schematic drawing of an optical memory system embodying the present invention.

As shown in the drawings for purposes of illustration, the present invention is embodied in an optical memory system, indicated generally by reference numeral 10, for the storage of digital data. The memory system 10 utilizes an electrophotographic dry film material as a recording medium 12. As best shown schematically in FIGS. 3 and 4, the medium 12 has submicron electrically photosensitive particles 14 embedded in a thermoplastic layer 16 mounted on a substantially transparent electrically conducting substrate 18. With the medium used in the presently preferred embodiment of the invention, the particles 14 are insensitive to light with a wavelength greater than 0.480 microns.

Figure 3:
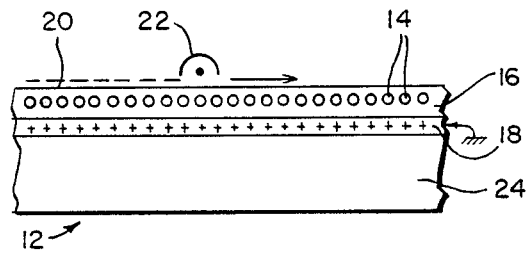
FIG. 3 is an enlarged, fragmentary schematic diagram showing the storage medium used in the memory system of FIG. 1 while receiving an initial surface charge.

The particles 14 are initially uncharged and the medium becomes sensitive to light only after receiving an initial surface charge. To apply the initial surface charge at a surface 20 of the medium 12, a Corona charging device 22 which extends along one length of the medium is moved laterally across the surface of the medium to apply a uniform charge intensity across the surface, as shown in FIG. 3.

Figure 4:
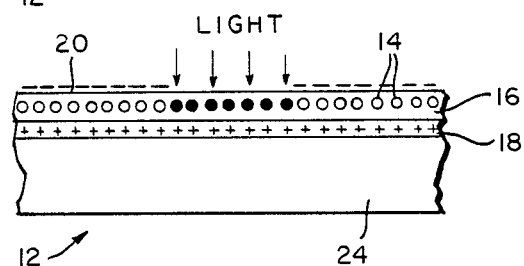
FIG. 4 is a schematic drawing showing the initial surface charged memory medium of FIG. 3 with light impinging thereon to transfer the surface charge in the region struck by light to the photosensitive particles embedded within the medium.

As shown in FIG. 4, when the medium 12 is exposed to light having a wavelength less than .480 microns, the initially uncharged particles 14 acquire a charge at the expense of the surface charge upon being struck by the light. As will be described in more detail below, the light used is a writing light beam modulated with a digital data signal. The thermoplastic layer 14 and conductive substrate 18 are mounted on a transparent glass backing 24. Additional details concerning the operation of the medium 12 with the present invention will be described below. It is noted that unlike when the film material is used as photographic film, the medium is not developed after being exposed to light by being subjected to a vapor, a liquid solvent or heat, and by so keeping the medium in an undeveloped state, the medium can be repeatedly charged, erased and recharged.

The electrophotographic material used in the preferred embodiment as the medium 12 is known as Xerox Dry Microfilm (XDM) and is described in greater detail in U.S. Pat. Nos. 3,357,989; 3,542,545; 3,648,607; 3,671,282; 3,720,513; 3,816,118; 3,979,210; 3,982,936; 3,985,560; 4,013,462; 4,014,695; 4,028,101; 4,040,826; 4,055,418, which are incorporated herein by reference.

The optical memory system 10 further includes a source 26 of continuous wave monochromatic writing light in the visible light range having a wavelength of less than 0.480 microns. A modulator 28 amplitude modulates the writing light at about a 20 megahertz rate according to a write data input signal on line 30 which embodies the digital data to be stored by the storage medium 12. In the preferred embodiment, the writing light source 26 is a non-coherent mercury lamp operating at a 0.4 micron wave-length. Collimation optics 32 form the modulated writing light into a substantially collimated writing light beam which is projected onto a cube beamsplitter 34 for transmission therethrough.

The write data input signal is provided by an input/output (I/O) device 35a controlled by a central processing unit (CPU) 35b of the computer with which the memory system 10 is operating.

The memory system 10 also includes a source 36 of near infrared, coherent and polarized reading light having a wavelength of greater than 0.480 microns. In the preferred embodiment, the reading light source 36 is a GaAlAs laser operating at a 0.82 micron wavelength. As will be more readily understood from the description provided below, the reading light source 36 may provide constant illumination and need not be switched on and off during operation of the memory system, even when the system is in a writing mode. Additionally, since the medium 12 is photosensitive to only the visible spectrum writing light, the near infrared reading light beam can pass through the medium without altering or modifying the stored charge on the particles 14, thus permitting repeated readings of the stored data.

The reading light produced by the source 36 is projected through collimation optics 38 to form a substantially collimated reading light beam which is projected onto beamsplitter 34. A reflected beam of the reading light beam and the transmitted writing light beam project from the beamsplitter along a single path for both the writing light beam and the reading light beam. A beam stop 40 is positioned to intercept the reading light beam transmitted through the beamsplitter.

As will be described in more detail below, the reading light beam is used only to read information from the memory medium 12, and the writing light beam is used only to write information to the medium. To accomplish this, the writing light beam has a wavelength greater than a threshold wavelength for the medium 12 above which the medium is photosensitive to light. In comparison, the reading light beam has a wavelength which is below the threshold, and thus the medium is insensitive to the reading light beam.

Figure 2:
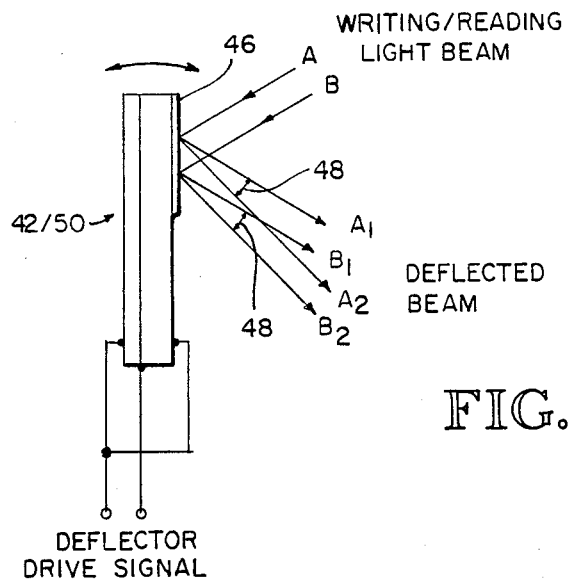
FIG. 2 is a schematic drawing of a beam deflector used with the memory system of FIG. 1.

A horizontal deflector 42 is positioned along the path to deflect which ever of the writing or reading light beam is present along a horizontal axis in response to a horizontal deflector drive signal provided by control circuitry, indicated generally in FIG. 1 by reference numeral 44. As best shown in FIG. 2, the deflector 42 is a solid state device having a bimorphic piezoelectric crystal electronically controlled by a horizontal deflector drive signal provided by the control circuitry 44. The deflector drive signal causes deformation of the bimorphic crystal and thus causes the writing/reading light beam which is incident upon a reflective aluminized surface 46 mounted on one side of the bimorphic crystal to scan along a horizontal axis at a selected scan speed. In FIG. 2, two light rays "A" and "B" are schematically shown as reflected off the aluminized surface 46 at times "1" and "2" which correspond to two of many possible angles of deflection permitted by the deflector 42. The angle of change between the reflected rays at time "1" and at time "2" is indicated by the doubled headed arrow 48 for both the "A" and the "B" rays.

Also in the path for the writing/reading light beam after it is deflected off the horizontal deflector 42 is a vertical deflector 50 of somewhat similar construction to horizontal deflector 42 except that the writing/reading light beam passes through the bimorphic crystal. The vertical deflector 50 deflects the writing/reading light beam along a vertical axis substantially orthogonal to the horizontal axis in response to a vertical deflector drive signal provided by the control circuitry 44. With appropriate drive signals to the horizontal deflector 42 and the vertical deflector 50, the writing/reading light beam can be caused to scan horizontally or vertically, across any desired portion of the medium 12.

After the writing/reading light beam passes through the vertical deflector 50, it passes through a horizontal cylindrical lens 52 and then through a vertical cylindrical lens 54 which condition the light beam and focus it to a focal point with a focal plane passing therethrough. A fixed mask 56 is positioned substantially in the focal plane and in juxtaposition with the medium 12.

Figure 5:
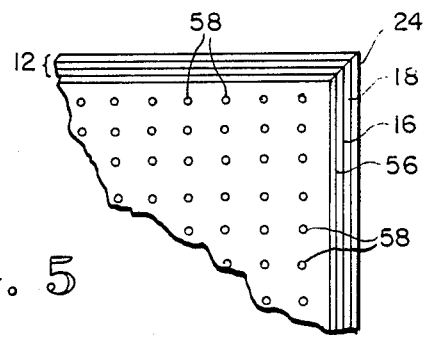
FIG. 5 is an enlarged, fragmentary view of the storage medium used in the memory system of FIG. 1 showing an aperture mask bonded to the medium.

The mask 56 is bonded to a side of the medium 12 which is toward the lenses 52 and 54. The mask is substantially opaque to the writing and reading light beams except for a matrix of horizontal rows and vertical columns of substantially transparent light admitting apertures 58 therethrough as is best shown in FIG. 5. In the presently preferred embodiment of the invention, the apertures 58 are circular transmissive portions one micron (i.e., $1.0 \times 10^{-6}$ meters) in diameter spaced apart on two micron centers, both along the rows and between the rows. With this arrangement, $25 \times 10^6$ apertures can be positioned in a matrix of 1.0 cm$^2$ in size having 5,000 rows and 5,000 columns of apertures. As such, using a relatively small 4.3 inch by 4.3 inch square mask 56 over a similar size block of medium 12, which is equivalent to about 119 cm$^2$ of area, it is possible to have $3.0 \times 10^9$ apertures. As will be described in more detail below, each aperture 58 defines the extent of a correspondingly sized region of the medium 12 which may have charged or uncharged particles. The charged or uncharged state of the particles is used to indicate whether the information stored in the region is a binary "1" or a binary "0", and the state of the particles may be detected using the reading light beam. This means that on a 4.3 inch by 4.3 inch square of medium 12, it is possible to store 3.0 gigabits of information which is approximately equal to the storage capacity of seven conventional 14 inch hard discs.

The focal plane mask 56 is manufactured using a diazo material which is developed using a photolithographic technique to form the opaque portions of the mask and the transmissive apertures 58. Other suitable techniques may be used to manufacture the mask.

By use of the focal plane mask 56, the focusing problems that have heretofore been encountered are eliminated since the apertures 58 serve as aperture stops. The apertures 58 have a diameter which is preferably greater than the wavelength of both the writing light and reading light moving through it so that no defraction problems are encountered. In the presently preferred embodiment of the invention, the writing light and the reading light have wavelengths of 0.4 and 0.82 microns, respectively, and the apertures have a diameter of 1.0 microns. It is noted that it may be possible to increase the density of the medium 12 by reducing the diameter of the apertures or the spacing between apertures, or both. It has been found that the film medium 12 being used in the presently preferred embodiment of the invention has sufficient resolution through use of the focal plane mask 56, that increased information packing can be achieved without diffraction problems.

The apertures 58 of the mask 56 define regions of the medium 12 which have not been struck by the writing light beam and hence have particles 14 which retain their initial uncharged state or have been struck by the writing light beam and hence have particles which have acquired a charge at the expense of the surface charge on the medium surface 20. Regions of the medium 12 with the charged particles and regions with the uncharged particles cause differing phase velocities of propagation for orthogonal elements of the reading light beam which results in angular rotation of the resultant electric and magnetic field vectors as it passes through the region. The electric and magnetic fields are rotated upon passing through a region with charged particles by a first degree of rotation, and upon passing through a region with uncharged particles by a second degree of rotation detectably different from the first degree of rotation.

When passing through a region with uncharged particles 14, the electric and magnetic fields of the reading light beam are rotated as a result of the initial charge placed upon the surface 20 of the medium 12. An even greater rotation is realized when the reading light beam passes through a region which has charged particles. This is because the initial surface charge might be at 100 volts while the region which has charged particles might be at 120 volts. The higher voltage is the result of the additional charge applied by photons impinging upon the photosensitive particles and imparting additional energy thereto. In the presently preferred embodiment of the invention, a region with charge particles and the first degree of rotation of the electric and magnetic fields of the reading light beam passing therethrough correspond to a binary "1", and a region with uncharged particles and a lesser resulting second degree of rotation correspond to a binary "0".

Because a specific amount of light energy must impinge upon a region of the medium 12 to exceed its sensitivity threshold value and thereby cause the photosensitive particles 14 embedded in the thermoplastic layer 16 (see FIGS. 3 and 4) to acquire a charge, each of the apertures 58 in the mask 56 must have a minimum opening size which is related to the time period the writing light beam will impinge on the medium through the aperture. The opening size must be large enough to admit sufficient energy when exposed to the writing light beam to exceed the sensitivity threshold value of the medium. Of course, the time period during which the writing light beam impinges upon the medium depends upon the scan rate of the beam, which is controlled by the control circuitry 44 and which will be described in more detail below.

Upon a region of the medium 12 defined by one of the apertures 58 being illuminated by the reading light beam, the reading light beam passes through the medium and then through a spherical lens 60 which focuses the reading light beam onto a light detector 62, which in the preferred embodiment of the invention is a light detecting photodiode having associated light detection circuitry, indicated by reference numeral 63. The light detector 62 generates an indicator signal indicating detection of the reading light beam, and provides the indicator signal to a pulse conditioning comparator 66. The photodiode is sensitive to the reading light beam incident thereon, but is insensitive to light at the wavelength of the writing light beam. The light detector 62 and circuitry 63 is a conventional OPIC light detector, such as model number IS006 manufactured by Sharp which includes both a light detecting element and peripheral circuits integrated onto one chip.

Positioned between the light detector 62 and the lens 60, and in the path of the reading light beam, is a Senarmont polarization compensator 64. The compensator 64 includes associated conventional circuitry (not shown). The compensator 64 detects and measures the angular rotation of the electric and magnetic field of the reading light beam by measuring the reading light beam intensity relative to a predetermined reference after passing through one of the regions of the medium 12 defined by one of the apertures 58. The reading light beam intensity will vary as a function of the degree of angular rotation of the electric and magnetic field vectors as predicted by the well-known Malus' law. The reference is based upon the rotation experienced by the reading light beam upon passing through a region of uncharged particles 14. The compensator 64, based upon the sensed phase difference between the reading light beam passing through the charged and uncharged regions, generates a data indicating signal on a line 65 to the light detector circuitry 63.

The data indicating signal effectively modulates the indicator signal amplitude from the light detector 62 and attenuates the indicator signal if a rotation is detected indicative of a recorded information bit of stored digital data at the binary logic state "0". An electronic signal amplitude comparator 66 monitors the indicator signal and by comparing the indicator signal to a predetermined amplitude threshold level, will produce a binary "1" output only when the indicator signal, and hence the detected degree of rotation corresponding to passage of the reading light beam through a region of charged particles, exceeds that predetermined threshold indicating a recorded information bit of "1". The output of the comparator 66 is a read digital data signal containing the digital data which was stored in the regions of the medium 12 scanned by the reading light beam. The read digital data signal is provided to the computer I/O device 35a.

To provide the initial charge to the surface 20 of the medium 12, a Corotron 68 extends the full vertical length of the medium and is selectively movable across the horizontal width of the medium. The Corotron 68 is a Corona charging device (as was the device 22 described with respect to FIG. 3) and has a back deflector 69 which essentially evenly sprays the surface 20 of the medium 18 with electrons to thereby provide a uniform charge intensity across the surface. After the initial charge is provided to the medium prior to any exposure with the writing light beam, the Corotron 68 is moved out of the path of the writing/reading light beam.

The medium 12 used with the invention is sensitive to temperatures elevated above normal ambient temperatures and the memory system 10 includes an erasure conditioner 70 which is a heatable shoe positioned adjacent to the glass backing 24 of the medium 12. The erasure conditioner heats a correspondingly sized selected portion of the medium 12 to a sufficiently elevated temperature to allow the charged particles in the corresponding portion of the medium to yield their charge and resume an uncharged state when subjected to a reversed polarity field. Since glass is used as the backing 24 (see FIGS. 3 and 4), the heat is transmitted primarily transversely through the glass, but not laterally so as to enable isolation of adjacent portions of the medium from the heat.

At present, the erasure conditioner is a 1 $cm^2$ foot which is selectively heated to heat the corresponding portion of the medium 12 to 70° C. or better. At about 70° C., the medium 12 is erased in approximately five seconds, and if the temperature is elevated somewhat, the erasure process can be completed more quickly. In practice, after the medium is heated, the Corotron charging device 68 is passed across the surface 20 of the medium corresponding to the portion heated, and a reverse polarity charge is applied thereto (i.e., reversed compared to that of the initial charge). This effectively removes the charge on the particles in that portion of the medium 12. After the medium has cooled sufficiently, the polarity of the Corotron 68 is changed back to that necessary to apply the initial charge, and an initial charge is applied to the surface of the erased portion of the medium 12 to, render the particles 14 in that portion photosensitive. The erased portion of the medium is now ready for storage of new digital data based upon the writing light beam impinging upon the medium and the photosensitive particles which have been relieved of their prior charge again being charged upon the incident thereon of the writing light beam. Unless erased, once charged, the photosensitive particles 14 retain their charge and establish a charged field in a region of the medium 12 without any physical deformation to the medium. The charge is held by the charge particles for prolonged periods of time and without the need to maintain any electrical power to the system.

By using an erasure conditioner 70 having an area less than the total surface area of the medium 12, the medium can essentially be divided into blocks which can have the regions of charged particles therein corresponding to the apertures of the block simultaneously erased by the erasure conditioner 70. In the preferred embodiment, the erasure conditioner 70 is a square heatable pad which is selectively movable about the surface of the medium 12 for erasure purposes, and then movable out of the writing/ reading light beam when not in use for heating the medium.

As discussed above, the control circuitry 44 provides the horizontal and vertical deflector drive signals to the deflectors 42 and 50 to control the horizontal and vertical scanning of the writing/reading light beam on the medium 12. The control circuitry 44 includes a synchronous controller 72 which controls the overall timing and operation of the controller circuit. The synch controller 72 provides control signals to two 20 megahertz clocks 74 and 76 which are respectively the clocks for the horizontal scanning circuitry and for the vertical scanning circuitry. Each of the clocks 74 and 76 provides its output to a corresponding horizontal scan counter 78 or a vertical scan counter 80. Each of these scan counters counts from 1 to 5,000 which corresponds to the 5,000 apertures 58 which exist in each row and each column of the focal plane mask 56.

The output of each of the scan counters 78 and 80 is provided to a corresponding horizontal digital-to-analog converter 82 or a vertical digital-to-analog converter 84. The digital-to-analog converters convert the digital counter output signal provided at the output of the scan counters to an analog voltage signal which serves as the deflector drive signal provided to the corresponding one of the horizontal or vertical deflectors 42 or 50. The analog voltage signal is used to deform the bimorphic piezoelectric crystal portion of the deflectors to cause the beam to scan horizontally or vertically, as desired. In such manner, under the control of the synch controller 72 the memory system 10 can be caused to automatically scan the medium 12.

In conventional fashion, the scan can also be manually controlled in the horizontal or vertical direction by horizontal manual scan circuit 86 and vertical manual scan circuit 88 which are responsive to the user manually inputting the particular information address which the optical memory is to write to or read from. The manual scan circuits 86 and 88 each provide a digital signal to the corresponding digital-to-analog converter 82 or 84, in much the same manner as provided via the automatic scan mode by the scan counters 78 and 80. It should be understood, that conventional scanning techniques may be used to control the scanning so as to provide a left to right horizontal scan of the rows of apertutes, or a left to right and then right to left interlacing scan of the rows of apertures. Of course, the medium could be scanned vertically by column rather than by rows.

While the memory system 10 has been described and shown utilizing a beamsplitter 34 which directs the writing light beam and the reading light beam along a single path through a single set of horizontal and vertical deflectors, since the read and write functions are accomplished with different wavelength lights, an optical system with separate horizontal and vertical deflectors for each of the writing light beam and reading light beam may be utilized. In such manner the writing and reading functions can occur simultaneously. To do so, scan control circuitry would be provided for each of the sets of horizontal and vertical deflectors.

It is noted that with the memory system 10 of the present invention, the system is controlled purely by optics and electronic devices without requiring any mechanical movement except for the slight movement produced by piezoelectric crystal deflectors. There are no mechanical heads which must be moved about and the information recording medium 12 is stationary. Since the medium does not have to be moved about, such as by rotation, and a read/write head does not have to be physically moved relative to the storage medium so as to align the head with the track or sector to be read or written to, the present invention provides a system which can operate at extremely high speeds limited only by the speed of the electronics and optical components involved. Inherently, the speed is substantially more than any system utilizing the mechanical components. Writing speeds significantly greater than 20 megahertz and reading speeds of 3 to 5 gigahertz are possible. This provides an improvement of several thousand times the access speed presently possible with a conventional, magnetic hard disc, while providing the equivalent storage capacity of many large size hard discs. Another benefit of the present invention is that the bit error rate is substantially improved over that possible with a magnetic hard disc and the power consumption is minimal.

As noted above, with the memory system 10 of the present invention, the writing light beam and reading light beam operate at two different frequencies which do not interfere with the operation of the other, and thus with appropriate control circuitry the memory system can be reading from the medium 12 at the same time it is writing to the medium. This arrangement inherently increases the speed of operation of the memory system and provides greatly increased efficiency of operation and speed. When coupled with the fact that the memory system utilizes no moving parts, the speed of operation of this system is greatly increased over anything available today.

It will be appreciated that, although specific embodiments of the invention have been described herein for purposes of illustration, various modifications may be made without departing from the spirit and scope of the invention. Accordingly, the invention is not limited except by the appended claims.

We claim:
1. An optical memory system for storage and retrieval of digital data, comprising:
    a source of writing light having a wavelength of less than 0.480 microns;
    means for amplitude modulating said writing light by a write digital signal containing the digital data to be stored;
    first lens means for forming said writing light into a substantially collimated writing light beam;
    a source of reading light having a wavelength of greater than 0.480 microns;
    second lens means for forming said reading light into a substantially collimated reading light beam;
    means for directing said writing light beam and said reading light beam along a single path;
    first means in said path for deflecting said writing/reading light beam along a first axis generally transverse to said path in response to a first control signal;
    second means in said path for deflecting said writing/reading light beam along a second axis generally transverse to said path and substantially orthogonal to said first axis in response to a second control signal;

third lens means in said path for focusing said writing/reading light beam to a focal point with a focal plane therethrough;

a stationary medium manufactured of a dry film having submicron electrically photosensitive particles embedded in a thermoplastic layer mounted on a substantially transparent electrically conducting substrate; said particles being insensitive to light with a wavelength greater than 0.480 microns, said particles being initially uncharged and said film being sensitive to light after receiving an initial surface charge, with said uncharged particle acquiring a charge at the expense of said surface charge upon being struck by said writing light beam, regions of said medium with said charged particles and with said uncharged particles causing differing angular rotation of the electric and magnetic fields of said reading light beam with the electric and magnetic fields being rotated upon passing through said region with said charged particles with a first degree of rotation and upon passing through said region with said uncharged particles with a second degree of rotation detectably different from said first degree of rotation, said first degree of rotation corresponding to a recorded information bit of said digital data at one binary logic state and said second degree of rotation corresponding to a recorded information bit of said digital data at the other binary logic state;

a fixed mask positioned substantially in said focal plane of said third lens means and in juxtaposition with said medium, between said medium and said third lens means, said mask being substantially opaque to said writing and reading light beams with a plurality of substantially transparent apertures, said apertures defining the extent of said regions of said medium with said charged and uncharged particles, each said aperture having a size to admit sufficient energy when exposed to said writing light beam for a predetermined time period to exceed a sensitivity threshold value of said medium and charge said particles in the corresponding region of said medium to produce charged particles, said apertures being arranged in a matrix having a plurality of rows and columns of said apertures, with said rows being aligned along said first axis and said columns being aligned along said second axis;

light detector means, positioned to be exposed to said reading light beam after passing through said mask apertures and said medium, and responsive to the incident of said reading light beam thereon and insensitivity to said writing light beam, for detecting the presence of said reading light beam, and for generating an indicator signal indicating detection of said reading light beam;

phase detector means, positioned to be exposed to said reading light beam after passing through said mask aperture and said medium, with said medium being oriented so that phase velocities of propagation for said reading light beam are altered, resulting in the rotation of said reading light beam electric and magnetic field vectors, for detecting the degree of angular rotation and for generating a data indicating signal indicating whether said detected degree of rotation corresponds to said first or second degree of rotation, whereby the binary logic state of a recorded information bit corresponding to one of said regions of said medium is determined;

control means, responsive to said data indicating signal, for inhibiting said indicator signal;

fourth lens means, positioned between said medium and said light detector means, for focusing said reading light beam onto said light detector means and phase detector means;

comparator means for receiving said indicator signal from said control means and comparing said indicator signal to a predetermined threshold level, and for generating a read digital data signal containing the stored digital data being read from said medium;

first means for generating said first control signal to deflect said writing/reading light beam to scan along a selected one of said rows of said apertures in the direction of said first axis at a selected scan speed, said selected scan speed for said writing light beam being such as to expose each of said apertures to said writing light beam for at least said predetermined time period to charge said particles in the corresponding region of said medium to produce charged particles;

second means for generating said second control signal to selectively deflect said writing/reading light beam to said selected row of said apertures;

charging means for substantially uniformly charging a surface of said film with said initial charge prior to exposure to said writing light beam, and for subjecting at least a portion of said film to a reversed polarity field from said initial charge for erasure thereof; and erasure means, movable into position adjacent to said medium, for heating a selected portion of said medium to an elevated temperature above ambient sufficient to cause said charged particles in said selected portion of said medium to yield their charge upon being subjected to said reversed polarity field by said charging means whereupon said charged particles resume an uncharged state, said erasure means being movable out of said writing/reading light beam when not in use for heating said medium.

2. The memory system of claim 1 wherein said first and second means for deflecting said writing/reading light beam are each an electrically controlled piezoelectric crystals deformable in response to said first and second control signals, respectively, to selectively angularly direct said writing/reading light beam along said first and second axis.

3. The memory system of claim 1, wherein said source of writing light has a wavelength of approximately 0.4 microns, and said source of reading light has a wavelength of approximately 0.82 microns.

4. The memory system of claim 1, wherein said mask apertures are approximately 1 micron or less in width and are spaced apart with a distance between adjacent ones of said apertures of about 1 micron or less.

5. The memory system of claim 1, wherein said first and second means for generating said first and second control signals each include a scan counter operating off a clock and providing a count signal to a digital to analog converter to produce said first and second control signals indicating the desired deflection of said writing/reading light beam to said first and second means for deflecting said writing/reading light beam.

6. The memory system of claim 5 wherein said clocks of said first and second means for generating said scan counters are controlled for synchronous operation by a synch controller.

7. The memory system of claim 5 further including manually operable input means to select said count signals to said digital-to-analog converters.

8. The memory system of claim 1, wherein said medium is mounted on a planar substantially transmissive glass backing to a side of said medium toward said fourth lens means.

9. The memory system of claim 8 wherein said erasure means is an electrically heatable pad having a size less than the size of said medium to heat a selected portion of said medium for erasure.

10. The memory system of claim 1, wherein said mask is formed from a photographic sheet developed to form said apertures as generally circular portion which are transparent to said writing/reading light beam and to form the remainder of said sheet as opaque.

11. The memory system of claim 1, wherein said mask is bonded to a surface of said medium toward said third lens means.

12. The memory system of claim 1, wherein said phase detector means includes a Senarmont compensator.

13. The memory system of claim 1, wherein said light detector means includes a photodiode.

14. An optical memory system for storage and retrieval of digital data, comprising:
a source of writing light having a first wavelength less than a threshold wavelength;
modulation means for modulating said writing light by a write digital signal containing the digital data to be stored;
means for forming said writing light into a writing light beam;
a source of reading light having a second wavelength greater than said threshold wavelength;
means for forming said reading light into a reading light beam;
means for deflecting said writing and reading light beams along a first axis in response to a first control signal;
means for deflecting said writing and reading light beams along a second transverse axis at an angle to said first axis in response to a second control signal;
lens means for focusing said writing and reading light beams to a focal point with a focal plane therethrough;
a stationary medium manufactured of a dry film having submicron electrically photosensitive particles embedded in a thermoplastic layer mounted on a substantially transparent electrically conducting substrate, said particles being insensitive to light with a wavelength greater than said threshold wavelength, said particles being initially uncharged and said film being sensitive to light after receiving an initial surface charge, with said uncharged particle acquiring a charge at the expense of said surface charge upon being struck by said writing light beam, regions of said medium with said charged particles and with said uncharged particles causing differing conditioning of said reading light beam, passage through said charged particles corresponding to a recorded information bit of said digital data at one binary logic state and passage through said uncharged particles corresponding to a recorded information bit of said digital data at the other binary logic state;
a fixed mask positioned substantially in said focal plane of said lens means and in juxtaposition with said medium, between said medium and said lens means, said mask being substantially opaque to said writing and reading light beams with a plurality of apertures substantially transparent to said writing and reading light beams, said apertures defining the extent of said regions of said medium with said charged and uncharged particles, each said aperture having a size to admit sufficient energy when exposed to said writing light beam for a predetermined time period to exceed a sensitivity threshold value of said medium and charge said particles in the corresponding region of said medium to produce charged particles, said apertures being arranged in a plurality of rows aligned with said first axis and positioned one row adjacent to the other in the direction of said second axis;
detector means, positioned to be exposed to said reading light beam after passing through said mask apertures and said medium, and responsive to the incident of said reading light beam thereon and insensitivity to said writing light beam, for detecting conditioning of said reading light corresponding to passage through one of said regions of said medium with said charged particles and to passage through one of said regions of said medium with said uncharged particles, and for generating a read digital data signal containing the stored digital data read from said medium, whereby the binary logic state of a recorded information bit corresponding to one of said regions of said medium is determined;
means for generating said first control signal to deflect said writing and reading light beams to scan along a selected one of said rows of said apertures in the direction of said first axis at a selected scan speed, said selected scan speed for said writing light beam being such as to expose each of said apertures to said writing light beam for at least said predetermined time period to charge said particles in the corresponding region of said medium to produce charged particles;
means for generating said second control signal to selectively deflect said writing and reading light beams to said selected row of said apertures; and
means for substantially uniformly charging a surface of said film with said initial charge prior to exposure to said writing light beam.

15. The memory system of claim 14, wherein said apertures are greater in width than both said first and second wavelengths.

16. The memory system of claim 15, wherein said threshold wavelength is about 0.480 microns and said apertures are approximately 1 micron or less in width.

17. The memory system of claim 14, wherein said detector means detects the angular rotation of the electric or magnetic field of said reading light beam after passing through one of said regions of said medium, with the degree of rotation relative to a threshold value indicating the binary logic state of a recorded information bit as a one or zero.

18. A computer system for processing storage and retrieval of digital data, comprising:
a central processing unit for processing of the digital data and master control of the computer system;, I/O means for inputting to and outputting from said central processing unit digital data to be stored or retrieved from storage said I/O means generating a write digital data signal containing the digital data to be stored;

a source of writing light having a first wavelength less than a threshold wavelength;

modulation means for modulating said writing light by said write data digital signal provided by said I/O means;

means for forming said writing light into a writing light beam;

a source of reading light having a second wavelength greater than said threshold wavelength;

means for forming said reading light into a reading light beam;

means for deflecting said writing and reading light beams along a first transverse axis in response to a first control signal;

means for deflecting said writing and reading light beams along a second transverse axis at an angle to said first axis in response to a second control signal;

lens means for focusing said writing and reading light beams to a focal point with a focal plane therethrough;

a stationary medium manufactured of a dry film having submicron electrically photosensitive particles embedded in a thermoplastic layer mounted on a substantially transparent electrically conducting substrate, said particles being insensitive to light with a wavelength greater than said threshold wavelength, said particles being initially uncharged and said film being sensitive to light after receiving an initial surface charge, with said uncharged particle acquiring a charge at the expense of said surface charge upon being struck by said writing light beam, regions of said medium with said charged particles and with said uncharged particles causing differing conditioning of said reading light beam, passage through said charged particles corresponding to a recorded information bit of said digital data at one binary logic state and passage through said uncharged particles corresponding to a recorded information bit of said digital data at the other binary logic state;

a fixed mask positioned substantially in said focal plane of said lens means and in juxtaposition with said medium, between said medium and said lens means, said mask being substantially opaque to said writing and reading light beams with a plurality of apertures substantially transparent to said writing and reading light beams, said apertures defining the extent of said regions of said medium with said charged and uncharged particles, each said aperture having a size to admit sufficient energy when exposed to said writing light beam for a predetermined time period to exceed a sensitivity threshold value of said medium and charge said particles in the corresponding region of said medium to produce charged particles, said apertures being arranged in a plurality of rows aligned with said first axis and positioned one row adjacent to the other in the direction of said second axis;

detector means, positioned to be exposed to said reading light beam after passing through said mask apertures and said medium, and responsive to the incident of said reading light beam thereon and insensitivity to said writing light beam, for detecting conditioning of said reading light corresponding to passage through one of said regions of said medium with said charged particles and to passage through one of said regions of said medium with said uncharged particles, and for generating a read digital data signal to said I/O means containing the stored digital data read from said medium, whereby the binary logic state of a recorded information bit corresponding to one of said regions of said medium is determined;

means for generating said first control signal to deflect said writing and reading light beams to scan along a selected one of said rows of said apertures in the direction of said first axis at a selected scan speed, said selected scan speed for said writing light beam being such as to expose each of said apertures to said writing light beam for at least said predetermined time period to charge said particles in the corresponding region of said medium to produce charged particles;

means for generating said second control signal to selectively deflect said writing/reading light beam to said selected row of said apertures; and means for substantially uniformly charging a surface of said film with said initial charge prior to exposure to said writing light beam.

* * * * *